United States Patent [19]
Goldenberg et al.

[11] Patent Number: 5,523,662
[45] Date of Patent: Jun. 4, 1996

[54] MODULAR, EXPANDABLE AND RECONFIGURABLE ROBOT

[75] Inventors: Andrew A. Goldenberg, Toronto; Nenad M. Kircanski, North York; Pawel Kuzan; Jacek A. Wiercienski, both of Oakville; Raymond Hui, Montreal; Chin Zhou, Toronto, all of Canada

[73] Assignee: Engineering Services, Inc., Ontario, Canada

[21] Appl. No.: 235,953

[22] Filed: May 2, 1994

[51] Int. Cl.⁶ .................................................... B25J 9/18
[52] U.S. Cl. .......................... 318/568.11; 318/568.12; 901/23; 901/15; 901/28
[58] Field of Search .................... 318/568.11, 568.12, 318/568.2, 568.21; 901/23, 15, 28

[56] References Cited

U.S. PATENT DOCUMENTS

| | | | |
|---|---|---|---|
| 4,738,576 | 4/1988 | Eberle et al. | 901/23 |
| 4,784,014 | 11/1988 | Bruns et al. | 901/23 |
| 4,816,955 | 3/1989 | Bruns et al. | 901/28 |
| 4,846,015 | 7/1989 | Keppler et al. | 901/28 |
| 5,085,619 | 2/1992 | Torrii et al. | 901/23 |
| 5,293,107 | 3/1994 | Akeel | 318/568.1 |
| 5,355,743 | 10/1994 | Tesar | 901/28 |

*Primary Examiner*—William M. Shoop, Jr.
*Assistant Examiner*—Karen Masih
*Attorney, Agent, or Firm*—Dowell & Dowell

[57] ABSTRACT

The subject invention provides a modular, expandable and reconfigurable robotic system. In one aspect of the invention there is provided a robot having at least two manipulators each having several compact rotary joints. The rotary joints have one input coupling and either one or two output couplings. Each joint is modular including a d.c. brushless motor coupled with a harmonic cup drive and includes position, velocity and torque sensors. Each manipulator may be disassembled and reassembled to assume a multitude of configurations. In another aspect of the invention there is provided an expandable and modular real-time computer control system for controlling the robot. The computer architecture achieves between 5 to 10 MFLOPS with reduced instruction set computing (RISC) processor nodes and a fast point-to-point communication network. Each node includes a host computer and parallel input/output (I/O) modules as well. The nodes are controlled by nearly zero-overhead real-time operating system (OS) kernels responsible for task scheduling, communication and user-interface. Each node is capable of controlling 8 joints at 1 kHz while executing over 1000 floating point operations per joint in each sampling interval.

18 Claims, 10 Drawing Sheets

MODULAR, EXPANDABLE AND RECONFIGURABLE ROBOT

FIELD OF THE INVENTION

The present invention relates to modular, expandable and reconfigurable robotic systems with a reduced instruction set computing (RISC) based computer architecture for real-time control of the robotic system.

BACKGROUND OF THE INVENTION

The proliferation of industrial robotic systems in manufacturing and assembly is well known and becoming very significant. Many robotic systems are assembled from off-the-shelf standard electrical/mechanical components. Many of these components are bulky and heavy and because the resulting robotic system is usually designed around these components, this results in unnecessary design constraints. For example, many industrial robotic joints are driven by electric motors mounted away from the joint and connected to the joint by a long rod. These types of robots suffer from a limited range of motion of the robot arm and such configurations must typically be used in dedicated applications. In many environments requiring robotic assistance, there are many different tasks to which a given robot could be assigned. However, such an advantage is not realized due to the aforementioned design constraints which precludes convenient conversion of the robot from one application to another. It would therefore be very advantageous to have a robot designed in such a way that it is free of undue design limitations and readily adapted to a variety of tasks. In other words, there is a need for a robotic system which is modular, reconfigurable and expandable.

The need for new robotic systems is also motivated by the lack of versatile test beds and dedicated systems useful for grasping and manipulation. Existing systems such as the Utah-MIT hand, the Stanford/JPL hand and others are mostly anthropomorphic and well-suited for specific applications only, have a small workspace and limited dexterity, or are mechanically dependent i.e. they require a supporting manipulator. There have also been robots constructed using a pair of similar manipulators for grasping an object with fixed contact, producing results of limited scope. Because there has been very little work done in this area of robotics it is not clear what types of mechanisms are most suitable. In order to provide a more versatile robotic system which overcomes the aforementioned limitations it is necessary to address issues such as (i) the suitability of a given kinematic structure for a given manipulation task; (ii) intelligent use of multiple manipulators for complex tasks such as parts-mating: (iii) compatibility of individual manipulators with different kinematic structures and dynamic properties: (iv) testing of cooperation schemes, and (v) optimization of load distribution to name a few.

The performance of the mechanical robotic system with many degrees of freedom is critically dependent on the real-time computer control system. Such a system must sample all the outputs of all the various types of sensors, compute the control commands dictated by the user-defined control algorithm and send the commands out to the actuators all within a pre-defined sampling interval. A drawback of existing computer controllers for multifingered hands and multiple manipulator systems such as those disclosed in Bejczy, A. and Szakaly, Z., "Universal Computer Control System (UCCS) for Space Telerobots", Proc. of IEEE Int. Conf. on Robotics & Automation, pp. 318–324, Raleigh, 1987; and Narasimhan, S., Siegel, D M. and Hollerbach, J. M., "Condor: A Revised Architecture for Controlling the Utah/MIT Hand", Proc. of IEEE Int. Conf. on Robotics & Automation, pp. 446–449, 1988; is that they have been designed intuitively starting from the available microprocessor technology without quantifying requirements in terms of computational complexity, sampling rate and I/O speed.

Therefore, for large-scale robotic systems instrumented with discrete and distributed sensors and actuators it would be advantageous to provide a real-time computer architecture capable of high computational throughput that can accommodate sophisticated control laws including complex feedback compensation and adaptive strategies, sub-millisecond sampling periods and high speed digital and analog I/O.

SUMMARY OF THE INVENTION

The present invention provides a modular robot joint. The robot joint includes a housing provided with first and second housing portions movable with respect to each other. The first and second housing portions are each provided with attachment means to which a connector member is releasibly attachable. The joint includes a motor being attached to the first housing portion and a transmission being operably coupled to the motor. The joint includes a torque sensor member coupled to the transmission. The torque sensor member is rigidly attached to the second housing portion so that when the transmission is driven by the motor the torque sensor member is responsively driven by the transmission to pivot the second housing portion relative to the first housing portion.

In another aspect of the invention there is provided a robotic manipulator. The robotic manipulator includes at least two connector members. Included is a robot joint comprising a housing provided with first and second housing portions movable with respect to each other. The first and second housing portions are each provided with attachment means to which a connector member is releasibly attached. The robot joint includes a motor attached to the first housing portion and a transmission operably coupled to the motor. The joint includes a torque sensor member coupled to the transmission. The torque sensor member is rigidly attached to the second housing portion. The robot joint includes position sensing means for sensing the position of the joint, whereby when the transmission is driven by the motor the torque sensor means is responsively driven by the transmission to pivot the second housing portion relative to the first housing portion. The robot includes computer control means for controlling the robotic manipulator and the computer control means operable to generate control signals for controlling the motor. The torque sensor and position sensor form part of a feedback loop control loop.

In another aspect of the invention there is provided a method for real-time control of a robotic manipulator system. The method comprises the steps of producing a dynamic model of the robotic manipulator system and combining said dynamic model with a PID regulator to produce a control scheme. The control scheme is then divided into two parts, a first part being a part that relates external forces and contact forces and accelerations, and a second part that contains a set of arms models. Off diagonal block elements of the control scheme which are zero are eliminated to produce a reduced control scheme. Control algorithms based on said reduced control scheme are then produced and implemented into a software package.

BRIEF DESCRIPTION OF THE DRAWINGS

The modular and expandable robotic system forming the present invention will now be described, by way of example only, reference being made to the accompanying drawings, in which.

DETAILED DESCRIPTION OF THE INVENTION

The mechanical structure of the modular, expandable and reconfigurable robotic system forming the present invention will be described first followed by a description of the computer architecture of the real-time control system.

Mechanical Structure of the Modular Robot

Figures 1, 2, 5:
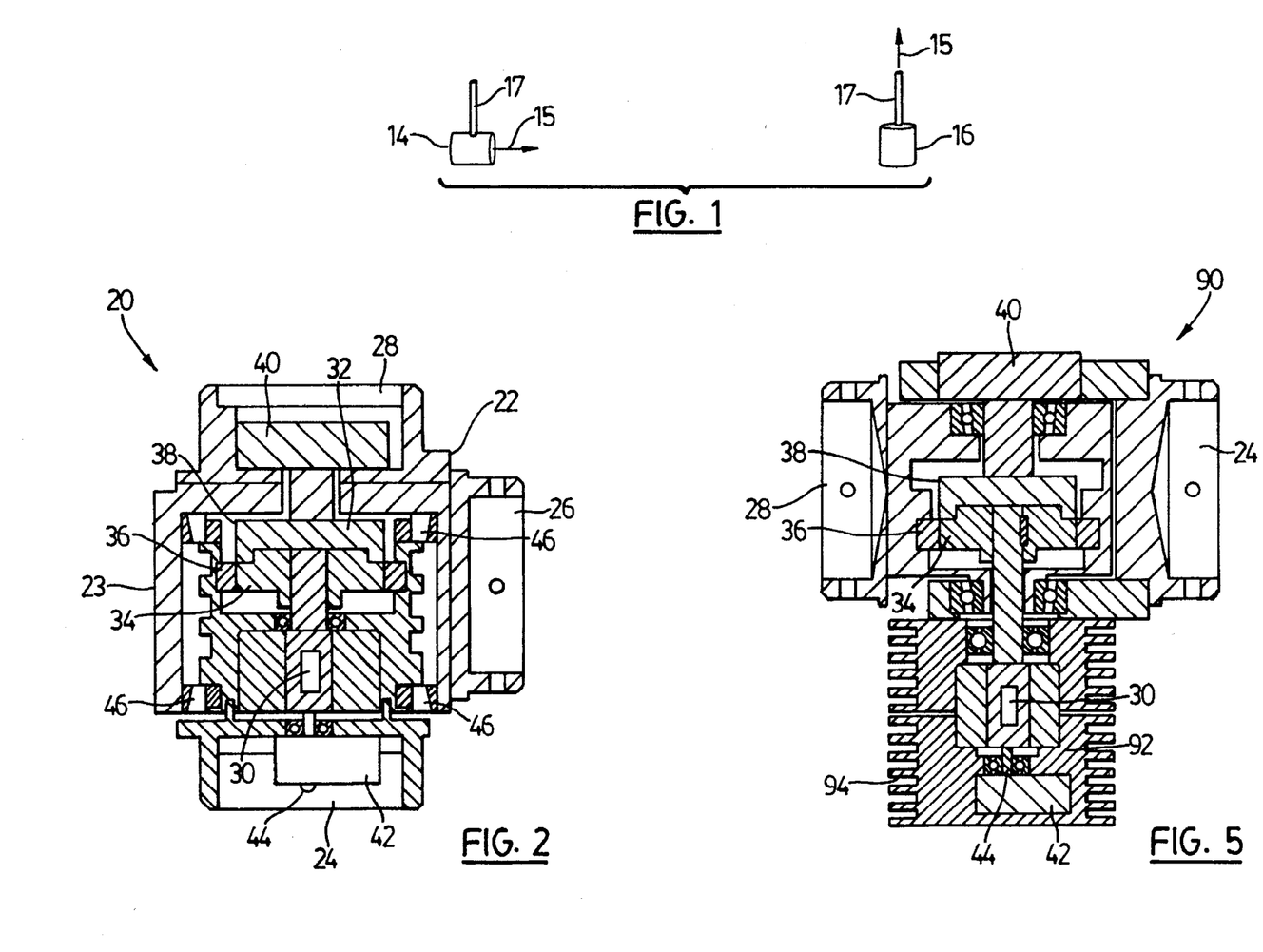
FIG. 1 is a schematic perspective view of two functional configurations of a rotary robot joint.
FIG. 2 is a simplified cross sectional diagram of a manipulator joint constructed in accordance with the present invention.
FIG. 5 is a simplified cross sectional view of a third embodiment of a manipulator joint.

In the ensuing description of the modular, expandable and reconfigurable robot system, like numerals refer to like parts. Referring to FIG. 1, a rotary joint of a robot manipulator may assume one of the two configurations: a type I joint as shown at 14 wherein the axis of rotation 15 of the joint is perpendicular to the axis of connector 17; and a type II joint as shown at 16 wherein the axis of rotation 15 of the joint is parallel the axis of connector 17.

Referring to FIG. 2, a manipulator joint shown generally at 20 includes a housing 22 having an outer housing shell 23, an input port 24 and output ports 26 and 28 disposed perpendicular to each other in housing shell 23. Mounted on the interior of housing 22 is a d.c. electric motor 30 which drives a harmonic transmission 32 comprising a wave generator 34, a circular spline 36 and a flexspine 38. A torque sensor 40 is mounted adjacent to output port 28 and a position sensor 42 is mounted adjacent inlet port 24 in close proximity to motor shaft 44 for detecting the position of the shaft. Tapered roller bearings 46 are positioned so that housing shell 23 rotates about the motor/transmission assembly.

Figure 3:
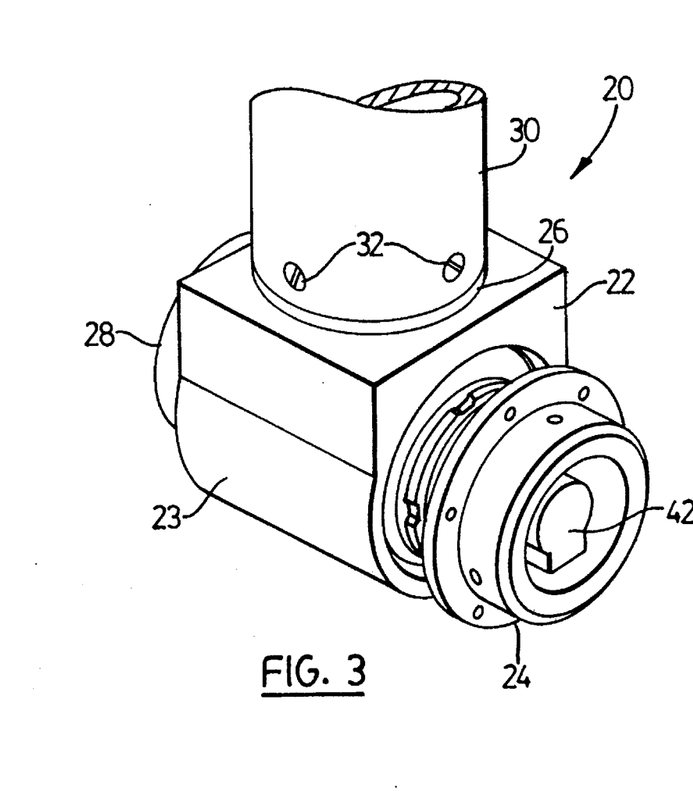
FIG. 3 is a perspective view of the manipulator joint of FIG. 2.

Referring to FIG. 3, a hollow, tubular link or connector member 30 may be secured to output port 26 as shown or alternatively to output port 28 (not shown). When a connector member is releasibly attached to output port 26 using screws 32 as in FIG. 3, the resulting manipulator joint is of joint type I, whereas if it is connected to output port 28, it is a type II joint. In use a connector is also secured to input port 24 (not shown) and when the motor is actuated, the outer housing shell 23 rotates with respect to the connector at the input and the motor/transmission assembly on tapered roller bearings 46. Input port 24 forms a first joint housing section and housing 22 with the output ports forms a second housing portion.

Figure 6:
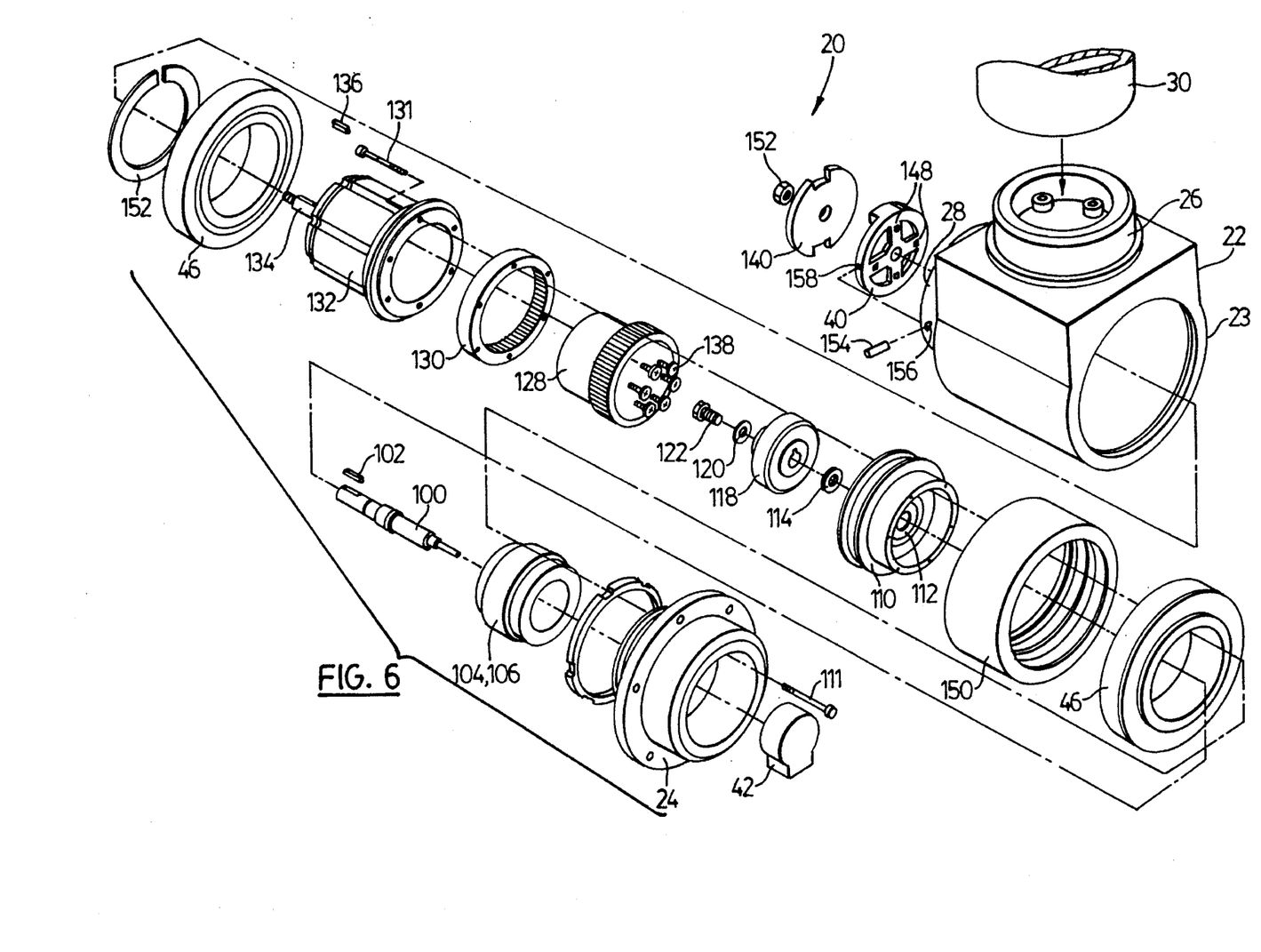
FIG. 6 is an exploded view of the manipulator joint of FIG. 3.

Structural details of joint 20 in FIG. 3 are shown in the exploded view of FIG. 6. It will be understood that the motor and transmission units are commercially available so that the drawings shown herein are meant to be illustrative, not detailed, and the description is not intended to be exhaustive. The motor comprises a slotted motor shaft 100 with key 102 receivable within the shaft slot. Shaft 100 extends through an armature/magnet assembly 104/106 which in turn is located on the interior of motor housing 110 having a bearing 112 through which shaft 100 passes. Motor housing 110 is rigidly secured to input port 24 by bolts 111. A retaining ring 114 is located between housing 110 and an elliptically-shaped wave generator 118. Wave generator 118 is secured on shaft 100 by a spring washer 120 and screw 122. A flexspline 128 engages a circular spline 130 which is rigidly secured to a cup-shaped flexspline housing 132 and to motor housing 110 by bolts 131. A slotted shaft 134 is attached to a plate 135 which is adjacent to the end portion of cup-shaped housing 132 with bearings disposed therebetween. Screws 138 are used to secure flexspline 128 to plate 135 so that the flexspline and shaft 134 rotate relative to cup-shaped housing 128 and circular spline 130. Torque sensor 40 is secured to shaft 134 by means of a key 136 when the joint is assembled. Sleeve 150 and retaining ring 152 form part of the motor/transmission assembly.

Torque sensor 40 is coupled with a safety disc 140 to prevent overloading and a nut 152 threaded onto shaft 134 secures the torque sensor to the motor/transmission assembly. A dowell pin 154 is inserted through a hole 156 in shell 23 and a hole 158 in torque sensor 40 in order to lock the torque sensor to the housing shell 23 (or housing 22). Torque sensor 40 includes an elastic member in the shape of a cross having four beams as shown in FIG. 6. Attached to the beams of the cruciform-shaped torque sensor 40 are strain gauges 148.

In operation, because flexspline 128 is slightly smaller in diameter than circular spline 130 it contains usually two fewer teeth on its outer circumference so that when wave generator 118 or high efficiency torque converter is inserted into flexspline 128 it distorts and holds the latter in an elliptical shape so that its teeth engage the circular spline across the major axis of the ellipse. When the wave generator is rotated clockwise by the motor, the zone of teeth engagement travels with the major elliptical axis so that when wavegenerator 118 has turned 180 degrees clockwise, flexspline 128 rotates counterclockwise by one tooth relative to circular spline 130. Therefore, each full turn of wave generator 118 causes flexspline 128 to move by two teeth in the opposite direction to circular spline 130. Because flexspline 128 is secured to torque sensor 40, which in turn is attached to housing shell 23, the torque sensor and housing are rotated by the same amount as the flexspline. Housing shell 23 rotates on tapered roller bearings 46 about an axis defined by motor shaft 100 and the end portion of shaft 100 is received within position sensor 42 as discussed previously.

Figure 4:
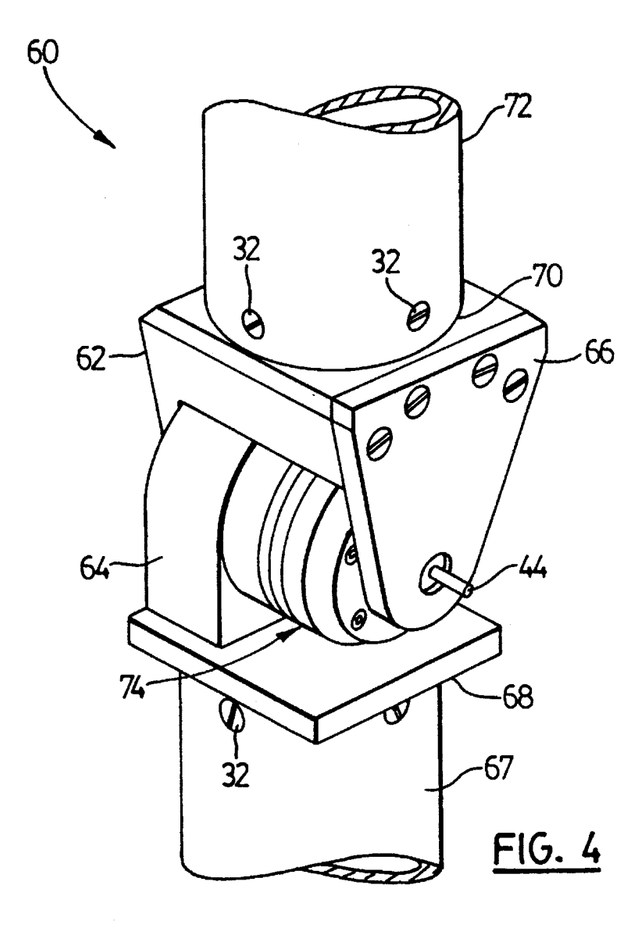
FIG. 4 is a perspective view of a second embodiment of a manipulator joint according to the present invention.

FIG. 4 illustrates a manipulator joint at 60 which is a type I joint only. Joint 60 includes a housing 62 provided with a first housing section 64 and a second housing section 66 which is pivotally or partially rotationally movable with respect to first housing section 64. An input port 68 attached to housing section 64 releasibly receives a connector 67 and an output port 70 forming part of housing section 66 releasibly receives a connector 72. A motor and transmission assembly 74 is integrated into joint 60 and is attached to housing section 64. Assembly 74 is coupled to second section 66 in such a way that when in operation, activating the motor pivots or partially rotates housing section 66 with respect to housing section 64 so that connector 72 moves with respect to connector 67. Joint 60 has an axis of rotation collinear with shaft 44. Housing section 66 pivots about this axis of rotation between limits such that upper housing portion 66 does not impact against lower portion 64.

Figure 7:
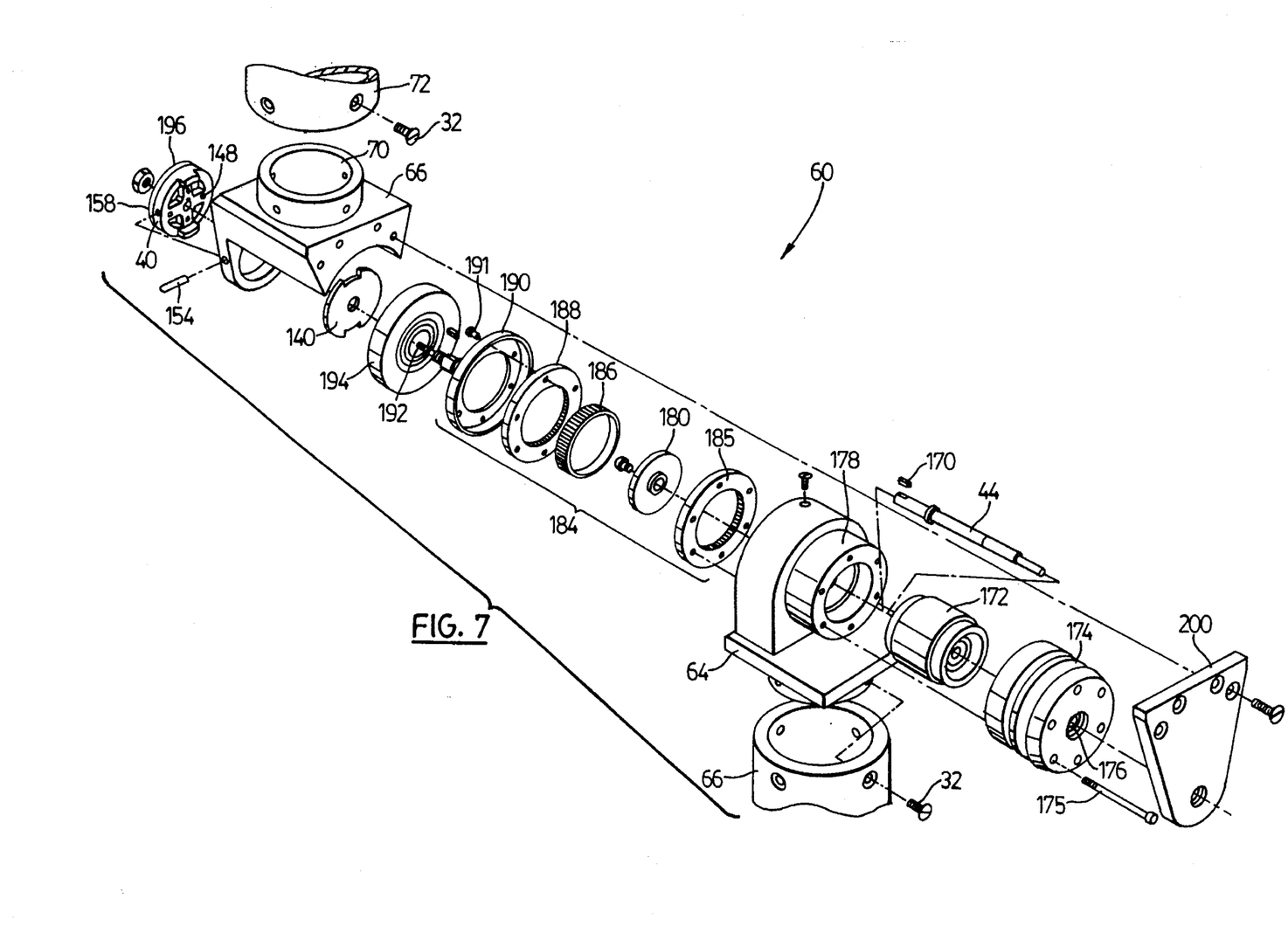
FIG. 7 is an exploded view of the manipulator joint of FIG. 4.
Figure 8A:
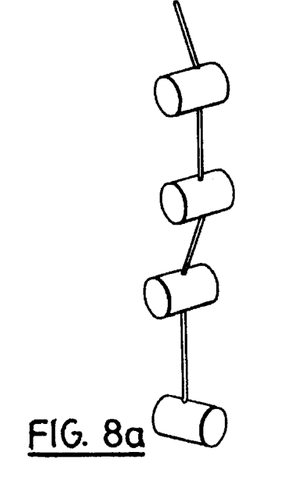
FIGS. 8a to 8m are schematic perspective views of different possible manipulator configurations which may be produced using the joints of the subject invention.
Figure 8B:
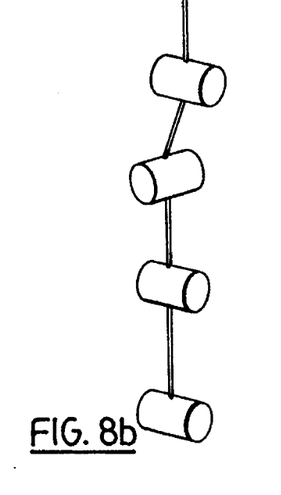
Figure 8C:
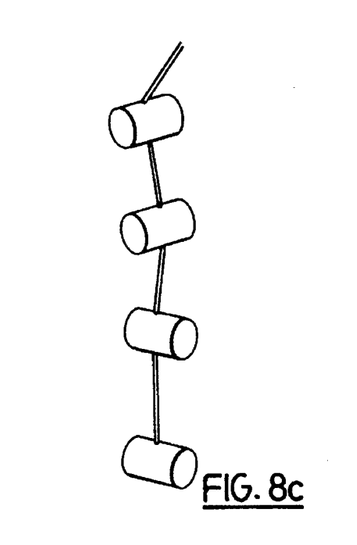
Figure 8D:
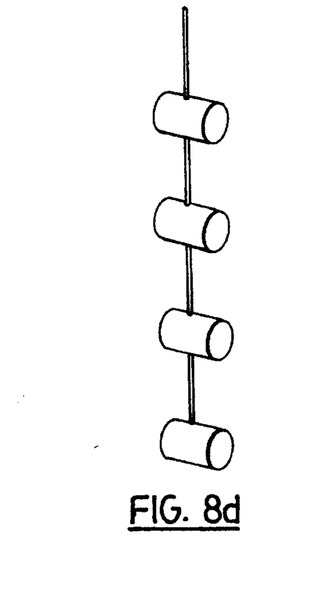
Figure 8E:
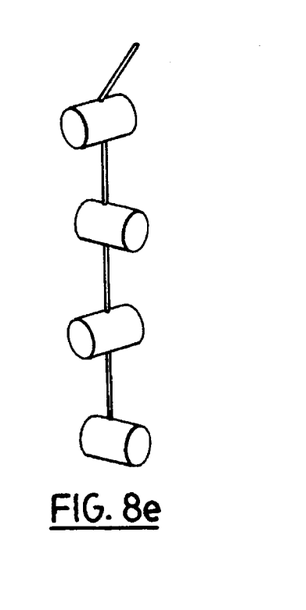
Figure 8F:
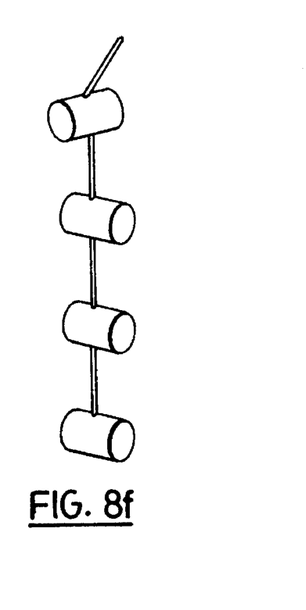
Figure 8G:
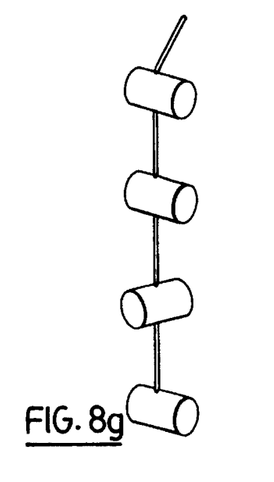
Figure 8H:
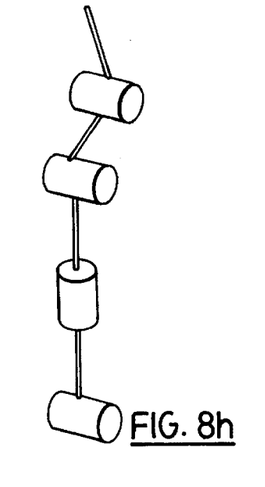
Figure 8I:
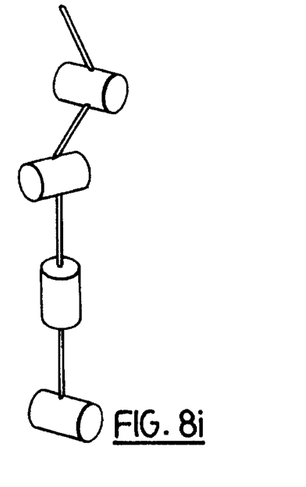
Figure 8J:
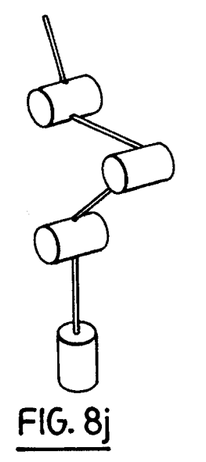
Figure 8K:
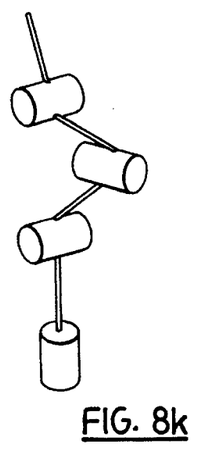
Figure 8L:
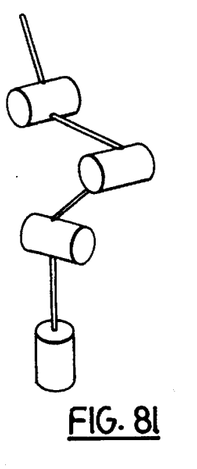
Figure 8M:
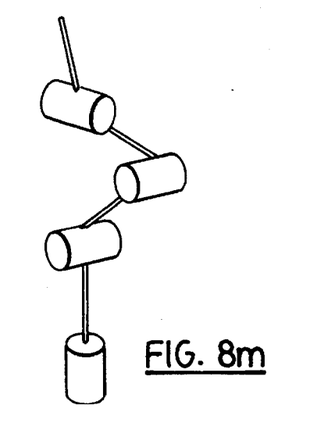

Structural details of joint 60 are illustrated in the exploded view of FIG. 7. Slotted motor shaft 44 receives a key 170. Shaft 44 extends through an armature/magnet assembly 172 which in turn is received on the interior of motor housing 174 having a bearing 176 through which shaft 44 passes. Housing 174 is secured by bolt 175 to a cylindrical tube 178 forming part of housing section 64. An elliptical wavegenerator 180 is bolted onto shaft 44 and rotates with the shaft. A pancake-type harmonic transmission 184 includes a flexspline 186 driven by wavegenerator 180. A first circular spline 185 is rigidly secured to housing section 64 by bolt 175. Flexspline 186 meshes with stationary circular spline 185 and a second circular spline 188 which is attached to transmission housing 190 by a bolt 191. A slotted shaft 192 extending through housing 190 engages and locks with torque sensor 40 when the joint is assembled. Safety disc 140 provides protection for torque sensor 40 and a spacer 194 is interposed between transmission housing 190 and disc 140. A protective plate 196 is located adjacent to torque sensor 40. An end plate 200 forms part of housing section 66.

Torque sensor 40 is rigidly secured to housing section 66 so that actuating the motor acts to pivot or rotate housing section 66 with respect to section 64. The operation of the motor and harmonic transmission 184 is essentially the same as the system described in FIG. 6 except that flexspline 186 engages two circular splines with spline 188 moving with the flexspline.

In both joints 20 and 60 the wave generator drives the flexspline which is coupled to the output ports through torque sensor 40. The torque sensor is mechanically coupled to the second housing portion in both cases (or the output ports) and the transmission, so that when the transmission is driven by the motor, the torque sensor is driven thereby moving the output ports. The rigidity of the torque sensor is much higher than that of the flexsplines. The cup-type harmonic drive of FIG. 6 is advantageous because it is characterized by zero-backlash compared to a small but non-zero backlash for the pancake-type drive of FIG. 7. However, pancake-shaped transmission 184 of FIG. 7 occupies a smaller volume.

The embodiments of the manipulator joints shown in FIGS. 3 and 4 are designed to incorporate the motor/transmission assemblies substantially on the interior of the housing. FIG. 5 illustrates another embodiment of a type I manipulator joint at 90 in which motor 30 is housed inside a housing 92 located on the exterior of the joint. Housing 92 includes an array of radiator fins 94 on the outside thereof to act as a heatsinking shell. Position encoder 42 measures the position of the motor shaft as is the case with joints 20 and 60.

Non-limiting examples of preferred d.c. electric motors used in the joints of the present invention are the Inland RBE series of brushless motors which come in a pancake shape and exhibit in general among the highest torque-to-mass ratios one of the best torque-to-size ratios as against other commercial motors. Brushless motors are characterized by a broader speed range than brush-type motors which are speed limited by commutation arcing and brush surface speed. The Inland series of motors are configured without frames thus making them preferable motors for incorporation into the joints of the present invention.

The preferred transmission system utilized in the present joints are harmonic drives sold by for example Harmonic Drive Technologies and HD Systems. The cup harmonic drives by HD Systems are particularly preferred.

Torque sensing is achieved by measurement of the resultant deflection of the flexible torque sensor forming the mechanical coupling between the motor/transmission assembly and the next output link or connector. Preferably, this element should be as close to the next output connector as possible in order to accurately measure the torque transmitted.

Therefore, torque sensor 40 is in the form of a cruciform with strain gages 148 mounted in a wheatstone bridge formation on its cross beams and is readily integrated in the design of every joint. It will be appreciated that more or fewer strain gauges may be used. Each strain gauge is coupled to a preamplifier and the amplifier outputs are coupled to the computer control system. The modular design of each joint facilitates removal of the torque sensor without affecting the mechanical integrity of the joint.

The preferred position sensor or encoder 42 is one which provides both high resolution and physical compactness. The position sensor 42 used in the joints disclosed herein is a HEDS-500 incremental optical encoder from Hewlett Packard. This is a compact sensor with 512 cycles available per revolution—equivalent to 2048 cycles after quadrature revolution. Advantageously, by connecting the position sensor to the output shaft of the motor, the resolution improves by a factor equivalent to the transmission ratio. Such a design requires for effectiveness that the harmonic drive and the torque sensor be sufficiently stiff. The present position sensor (encoder) is contiguous to the motor shaft and hence does not measure the deflection of the torque sensor and harmonic drive. However, this is not problematic if the harmonic drive and torques sensor are sufficiently stiff as mentioned.

Velocity feedback may be obtained by differentiating the output of the position sensor and filtering the resulting signal, or by counting the number of pulses from the output of the incremental encoder over a fixed sampling interval. The second alternative may be done in software or using dedicated electronic hardware. The hardware option is preferred because the processor can be freed from the task of signal processing. In order to achieve a tip velocity as low as 1 mm/sec, the joint encoder must have sufficiently high resolution such as the corresponding joint velocity can be measured.

The manipulator links or connectors may be hollow tubes to reduce weight, depending on the intended application. The manipulators of the robot may be assembled with connectors of varying length to produce manipulators of any desired length.

The manipulator joints of the present invention are highly integrated electro-mechanical devices. The manipulator joints are advantageously very compact and capable of producing a pre-specified range of torques and velocities. The advantage of using frame-less motors and transmissions is a significant reduction in weight and size to give a power-to-mass ratio significantly higher than prior art joints. Heat dissipation is achieved by integrating the motor and transmission into the joint housing. Each joint includes one input port and either one output port (FIG. 4) or two (FIG. 3).

The independent temperature-compensated torque sensor is designed to occupy a small volume and provides a very precise determination of applied torque over the required range of torques. The integrated motor/transmission/torque sensor unit is a high performance electro-mechanical device capable of producing very smooth motion even at very low velocities. This smooth motion is achieved by use of the electronic torque feedback loop. The desired torque is achieved by driving the motor so that real measured torque matches the desired torque. Most internal friction forces are compensated for by employing the torque feedback loop, i.e. the whole manipulator joint behaves as a virtually friction-less backlash-free ideal drive unit.

The input and output ports to which connectors can be rapidly attached or detached facilitate rapid reconfiguration of the manipulators. As seen in FIG. 7, the connector members may be releasibly attached to the inlet/outlet ports in several rotational orientations thereby increasing the flexibility of the resulting manipulator. A variety of robot configurations may be obtained by using several joints 20 in the joint type I or II configuration, or by using a combination of joints 20, 60 and 90 in the assembled manipulator. End effectors (not shown) are attachable to the free end of the manipulator at the end of the manipulator.

Figure 9:
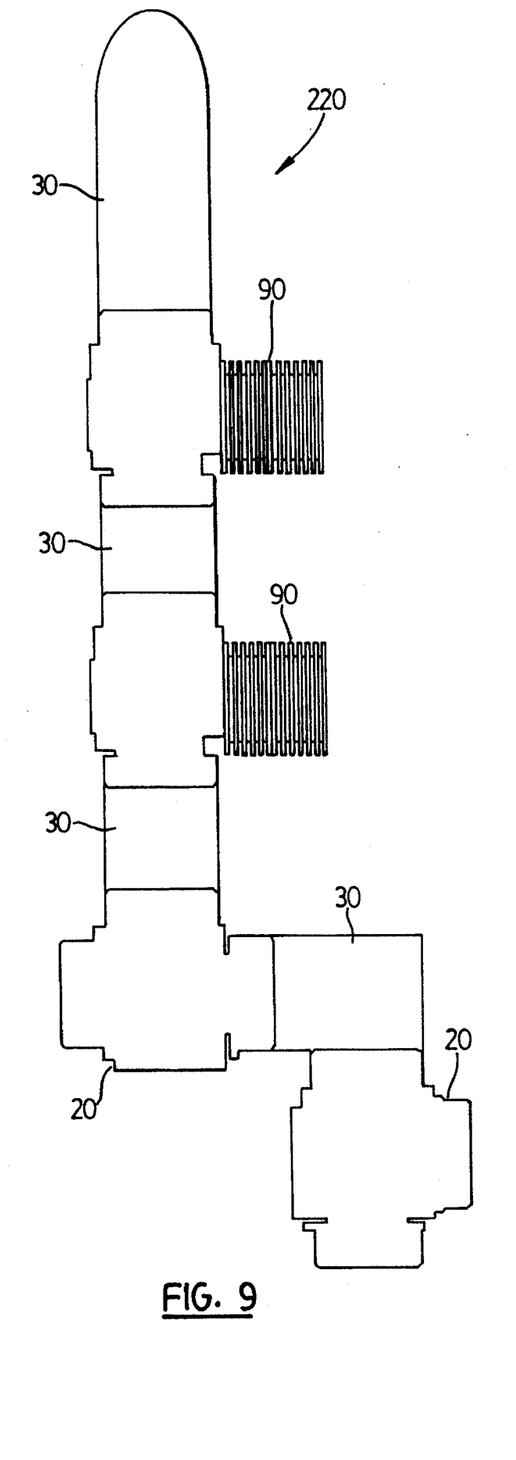
FIG. 9 is a cross sectional view of one possible configuration of a manipulator using the joints of FIGS. 2 and 5.
Figure 10:
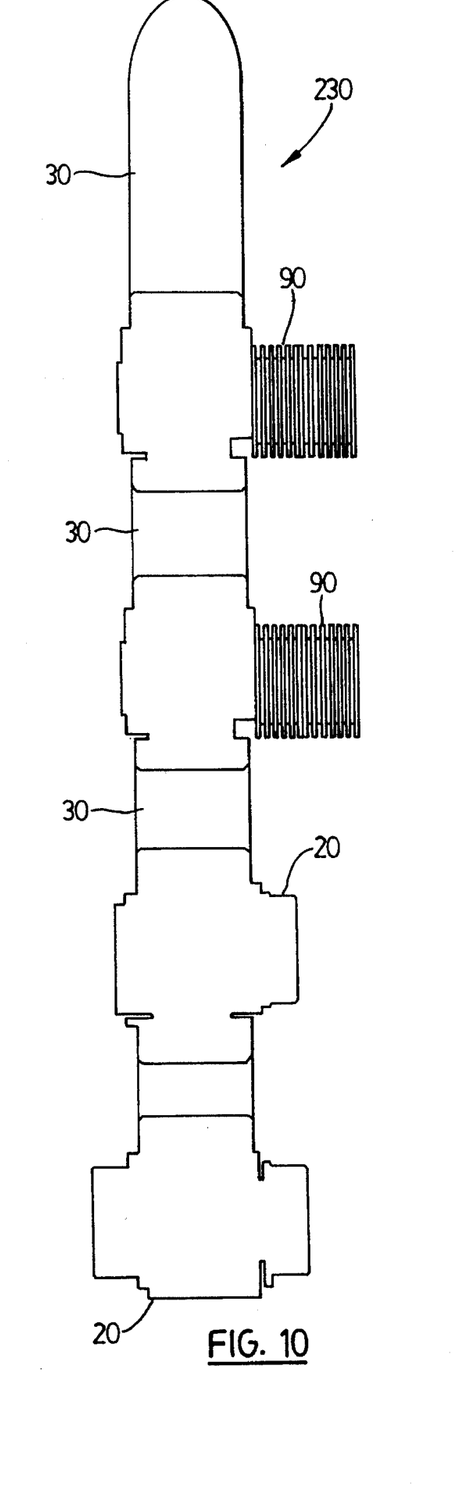
FIG. 10 is a cross sectional view of another configuration of a manipulator using the joints of FIGS. 2 and 5.

Example manipulator configurations using four type I joints are seen in FIGS. 8a to 8g and configurations using a combination of type I and type II joints are seen in FIGS. 8h to 8m. Manipulator configurations with four joints using joints 20 and 90 are shown at 220 and 230 in FIGS. 9 and 10 respectively. Further flexibility is achieved by being able to attach connectors to the output ports in any one of several rotational positions as previously mentioned. The number of joints in each manipulator can be varied depending on the intended application.

Risc Processor Based Architecture For Computer Control

The modular, expandable and reconfigurable robotic system disclosed herein comprises manipulator arms that may be easily disassembled and reassembled to assume a multitude of configurations. The joints are instrumented with internal and external optical position encoders and joint torque sensors while the frameless brushless d.c. motors and harmonic drive gears are used to minimize the size and weight of each joint.

The following real-time computer control design objectives have been established by the inventors for efficient control of the modular robotic systems: (i) high computational throughput that can accommodate the most sophisticated control laws including complex feedback compensation and adaptive strategies, (ii) sub-millisecond sampling period; (iii) high speed digital and analog I/O; (iv) an open and friendly user interface; (v) the system must have the attributes of an efficient real-time control system-nearly zero overhead multitasking environment, multiple timers, interrupt services, semaphore and event managers, etc.; and (vi) the system should be modular and expandable.

Using the best-known feedback control schemes for force/position control for multiple robot systems such as resolved acceleration control and hybrid impedance control, the inventors have shown that in general a capability of nearly 100 million floating point operations per second (MFLOPS) is required if the control law of choice is implemented in a straightforward manner at 1 kHz frequency. The inventors have discovered that by customizing the system model, this computational demand can be reduced to an acceptable level of several MFLOPS. This procedure will be discussed below and utilizes and adapts the decomposition of sparse quasi-diagonal matrices into matrices of lower dimensions and the customization technique developed for single-arm robot models.

Several schemes have been proposed in the literature for controlling the motion and the object gripping forces in multi-manipulator systems: hybrid force/position scheme as discussed in Arimoto, S. and Miyazaki, F., "Cooperative Motion Control of Multiple Robots or Fingers", Proc. of IEEE Int. Conf. on Robotics & Automation, pp.1407–1412, Raleigh, 1987; computed torque algorithm as discussed in Li, Z., Hsu, P., Seatry, S., "Grasping and Coordinated Manipulation by a Multifingered Robot Hand", The Int. J. of Robotics Research, vol. 8, no. 4, pp. 33–50, 1989; and active stiffness as discussed in Salisbury, J. K. and Craig, J. J., "Articulated Hands: Force Control and Kinematic Issues", The Int. J. of Robotics Research, vol. 1, no. 1, pp 4–17, 1982.

Most of these schemes are based on a simple proportional integral and derivative controller (PID) regulator combined with the dynamic model of the entire system $$\tau = M\ddot{X} + h + J_h^T(G^+ f_e + f_I) \quad (1)$$

where $\tau$ is the n-vector of applied torques (n is the number of joints), X is the object coordinate vector, M is the n×6 inertial matrix, h is the n-vector that depends on velocity terms, $J_h$ is the $n_o \times n$ Jacobian matrix that maps joint velocities into contact velocities, $G^+$ is the least squares generalized right inverse of the grasp matrix G,), $f_e$ and $f_I$ are external and internal force vectors. To provide the relation between joint end object velocities the following kinematic model is also needed:

$$\dot{X} = (G^+)^T J_h(q) \dot{q} \quad (2)$$

where q refers to joint coordinate space, X=p(q). Because of low inertia and masses, most of the artificial hand control algorithms are based on the kinematic model (2). The dynamic model (1) is mainly used for model-based control of multiple arm cooperation. The number of multiplications and additions involved in matrix/vector operations on the right side of (1) is approximately:

$$N = n_c^3 + 3nn_c^2 + 32nn_c + 14n^2 + 129.5n_c + 72n + 231$$

that gives more than 30,000 floating point (FP) operations for four degree-of-freedom (4-DOF) arms/fingers manipulating a single object, i.e. nearly 2,000 operations per joint. To reduce computational burden advantage is taken of the special nature of the matrices in (1) because there are off-diagonal blocks that are always zero. By dividing the model (1) into two parts: the object's model that relates external forces and the contact forces and accelerations, and the set of arms models, the computational complexity becomes significantly reduced.

In addition to elimination of large sparse matrices, it is important to apply the most efficient algorithms for computing dynamic model of each particular arm/finger in the system. The most efficient methods are referred to as customizing symbolic modelling methods. For this purpose the inventors have adopted the SYM modelling software as disclosed in SYM—User's guide, Robotics Department, Mihailo Pupin Institute, Belgrade, 1990; which is incorporated herein by reference. Generally, the range of the speed-up factor is from 5 to 10.

Figure 11:
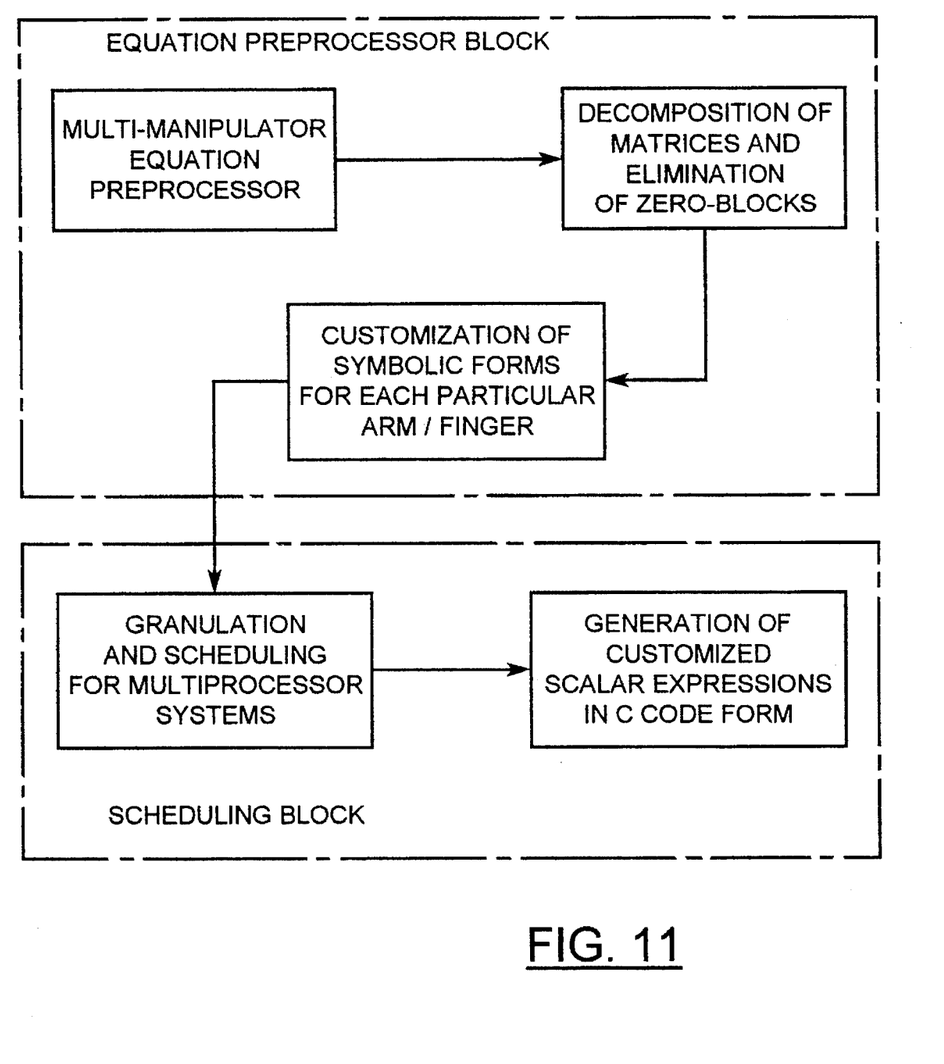
FIG. 11 is a diagram of the equation preprocessor block forming part of the computer control architecture for the robot.

The described method is integrated into a software package based on the SYM modeller developed for single-arm manipulators (Equation preprocessor block in FIG. 11). Additional advanced features related to the scheduling of the overall computational burden among parallel processors or computer nodes are included as well. For this purpose algorithms developed for transputer networks as discussed in Kircanski, N., Petrovic, T., Vukobratovic M., "A Parallel Computer Architecture for Real-Time Control Applications in Grasping and Manipulation", Accepted for the IEEE Int. Conf. on Robotics & Automation, Atlanta, 1993, and incorporated herein by reference, are implemented as a part of the Scheduling block in FIG. 11.

The chief objective of the computer architecture is to allow various multi-arm configurations to be operated under different control laws at different sampling rates. In order to avoid relatively complicated division of control software into "slow" and "fast" processes (a process is a task activated periodically by a corresponding timer routine), the overall system performance must be high enough to allow the whole control task to be executed at a maximum rate determined by the sampling frequency.

In spite of enormous number of papers in the field of robotics control, the sampling rate, though essential for control quality, has not been addressed very often. A typical range of sampling time is from 1 to 20 ms. Clearly, the control parameters depend on sampling time, but how to select an optimum sampling period is not clear from the prior art.

Since the sampling frequency is mainly determined by the bandwidth of the actuator, the low inertia motor/harmonic drive transmission assembly described above is used in the joints. In addition, the joint was constrained against a fixed surface to prevent the damping due to the free space motion of the output link to the joint. This is a common situation when the arms are in contact with an object being grasped. The joint torque sensor response to a sinusoidal motor current with a variable frequency in the range from 1 to 1000 Hz was recorded to provide a reliable information about the frequency bandwidth. The magnitude response (not shown) shows that the constrained joint behaves as a low-pass second-order system with a 50 Hz bandwidth. To be able to emulate continuous control action, a 1 KHz sampling frequency was used as a reference. In this case even high frequency modes (up to 100 Hz) are sampled at least 10 times per cycle which is sufficient for continues time control emulation.

The maximum time delay between the sampling and the control action was limited to one sampling interval. This means that no pipelining was allowed for increasing the system throughput. Despite the fact that the pipelining may significantly improve the multiprocessor system speed, it is well known that it cannot reduce the overall time delay. For this reason, only internal processor pipelining was allowed.

The control system of the present invention uses the AMD 29050 RISC processor and studies have shown that a real speed of 10 MFLOPS are deliverable for the C-coded robot application program tested. The RISC computer boards utilize the Modified Harvard Architecture implemented to provide separate instruction and data memory. This separation allows extremely high performance, since it allows instruction and data to be fetched simultaneously.

Figure 12:
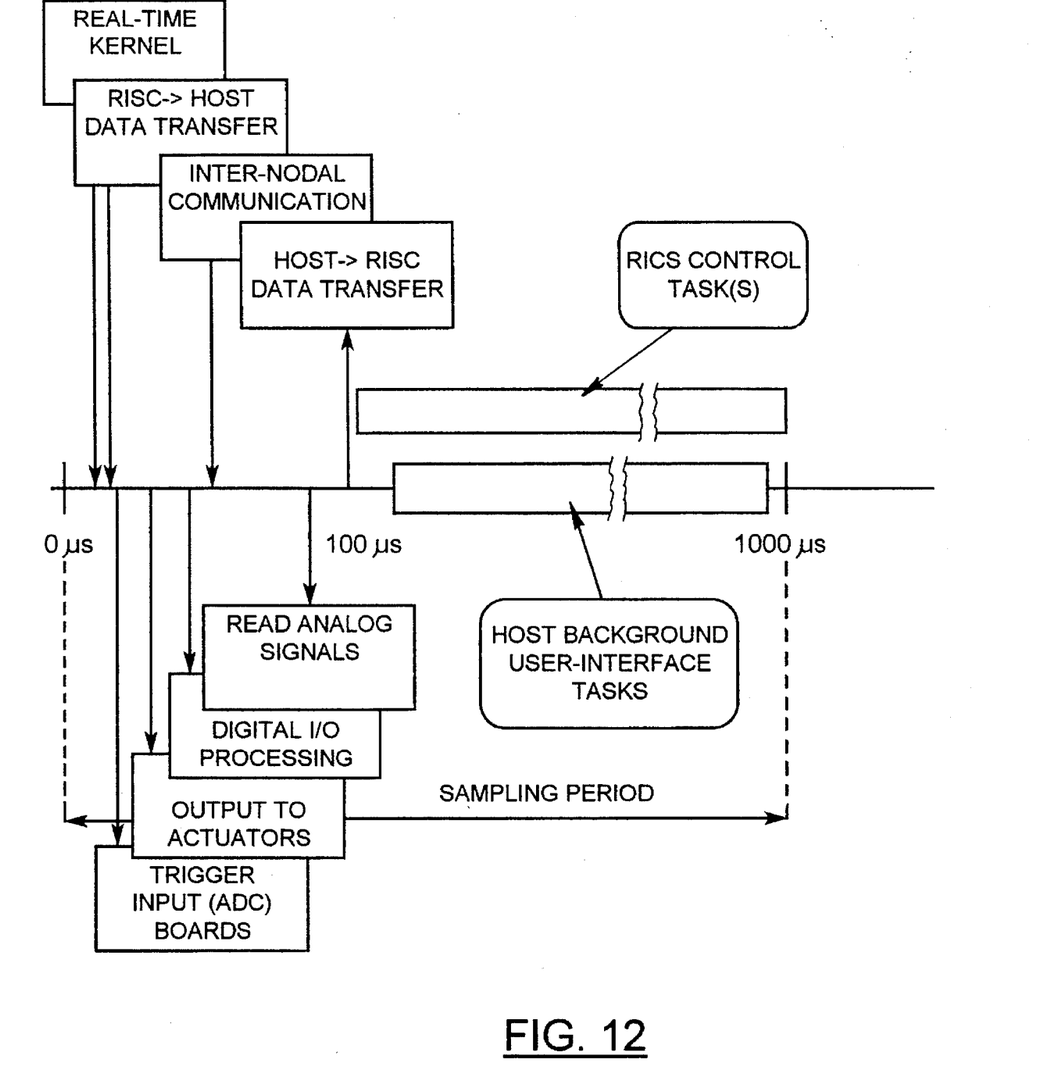
FIG. 12 illustrates the different parallel activities which are supported by the computer control system.

Referring to FIG. 12, the RISC board is tightly coupled with the host computer based on 50 MHz Intel 80486 processor accelerated with a large cache memory. These two processors, parallel I/O system and communication modules constitute a powerful computer node. The host computer must support many virtually parallel activities: tasks running under different priorities, user interface, I/O signal processing, data acquisition, communication with other nodes and communication with the RISC processor. To cope with all these requirements, instead of starting from a traditional OS such as MSDOS or Unix. a Kadak's AMX real-time software development tool is used which provides a convenient and user-friendly window-oriented operating system (OS) kernel generator. The generator allows the user to select the number of tasks, priorities, task names, parameters of timers, interrupts, etc. FIG. 12 illustrates all parallel activities in each sampling interval.

Figure 13:
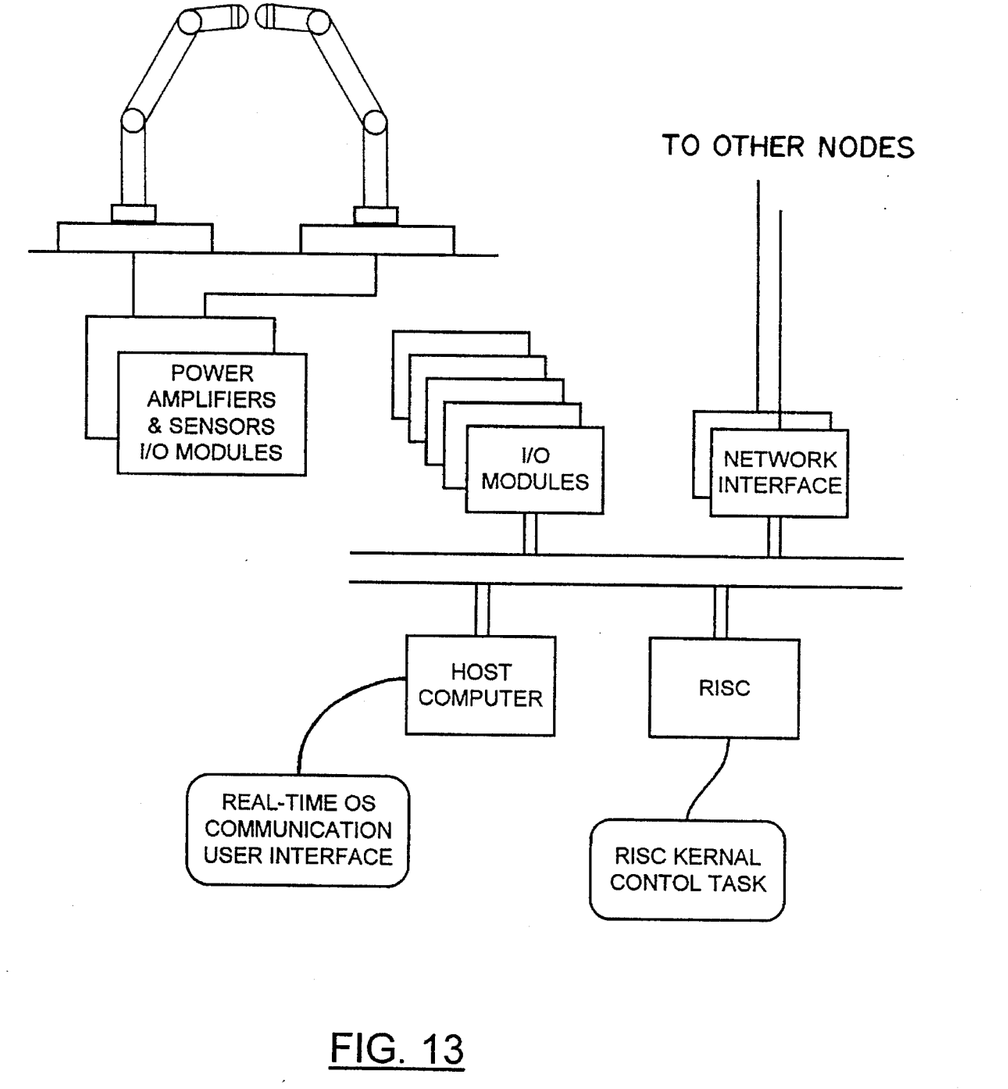
FIG. 13 is a block diagram of the control system architecture of the present invention.

High analog I/O speed is achieved by the exploitation of parallel I/O boards triggered almost simultaneously to scan all channels in series without interfacing to the host. The host uses the ADC time to service other requirements such as digital data acquisition and processing, interfacing to the other nodes, etc. The overall I/O time delay is equal to the ADC conversion time of just one board (40 μs). Real-time kernel overhead is only about 20 μs. The control system architecture is shown in FIG. 13.

While the modular, expandable and reconfigurable robotic system has been described and illustrated with respect to the preferred embodiments in respect of both the mechanical structure and computer control system, it will be appreciated by those skilled in the field that numerous variations of this system made be readily made without departing from the scope of the invention disclosed herein.

Therefore what is claimed is:

1. A modular robot joint, comprising:

a) a housing provided with first and second housing portions movable with respect to each other, said first and second housing portions each being provided with attachment means to which an associated connector member is releasibly attachable;

b) a motor being attached to the first housing portion;

c) a transmission being operably coupled to the motor; and d) an elastic member being coupled to said transmission, said elastic member being rigidly attached to the second housing portion, whereby when the transmission is driven by the motor the elastic member is responsively driven by the transmission to pivot the second housing portion relative to the first housing portion, means connected to said elastic member for measuring torque applied to said elastic member.

2. The robot joint according to claim 1 wherein said robot joint has an axis of rotation, and wherein said second housing portion pivots about said axis of rotation.

3. The robot joint according to claim 1 wherein said second housing portion includes first and second attachment means.

4. The robot joint according to claim 3 wherein said first and second attachment means are disposed substantially perpendicular to each other on said second housing portion, wherein when a connector member having an axis of rotation is attached to said first attachment means the connector member axis of rotation is perpendicular to the axis of rotation of said joint, and wherein when said connector member having the axis of rotation is attached to said second attachment means the connector member axis of rotation is collinear with the axis of rotation of said joint.

5. The robot joint according to claim 1 wherein said motor is a direct current brushless motor.

6. The robot joint according to claim 5 wherein said transmission is a harmonic drive transmission.

7. The robot joint according to claim 1 wherein said elastic member includes a cross-shaped portion having four beams.

8. The robot joint according to claim 7 wherein said elastic member is provided with a strain gauge mounted on each of said four beams.

9. The robot joint according to claim 8 including a preamplifier coupled to each of said strain gauges, said preamplifier being attached to said housing.

10. The robot joint according to claim 1 wherein the joint includes position sensing means.

11. The robot joint according to claim 10 wherein said motor includes a motor shaft and wherein said position sensing means senses the angular position of the motor shaft.

12. The robot joint according to claim 9 including computer control means for controlling the movement of said joint, wherein said means for measuring torque applied to the elastic member forms part of a feedback control loop.

13. A robotic manipulator, comprising:

a) at least two connector members;

b) a robot joint comprising a housing provided with first and second housing portions movable with respect to each other, said first and second housing portions each being provided with attachment means to which an associated connector member is releasibly attached, the robot joint including a motor attached to the first housing portion and a transmission operably coupled to the motor, the joint being provided with an elastic member being coupled to said transmission, said elastic member being rigidly attached to the second housing portion, means connected to said elastic member for measuring torque applied to said elastic member, the robot joint including position sensing means for sensing the position of the joint, whereby when the transmission is driven by the motor the elastic member is responsively driven by the transmission to pivot the second housing portion relative to the first housing portion; and c) computer control means for controlling said robotic manipulator, said computer control means operable to generate control signals for controlling said motor, wherein said means for measuring torque applied to the elastic member and said position sensor form part of a feedback control loop.

14. The robotic manipulator according to claim 13 including two manipulators, said computer control means being operable to simultaneously control said two manipulators.

15. The robotic manipulator according to claim 13 wherein said motor is a direct current brushless motor.

16. The robotic manipulator according to claim 15 wherein said transmission is a harmonic drive transmission.

17. The robotic manipulator according to claim 13 wherein said elastic member includes a cross-shaped portion having four beams.

18. The robotic manipulator according to claim 17 wherein said elastic member is provided with a strain gauge mounted on each of said four beams and including a preamplifier coupled to each of said strain gauges, said preamplifier being attached to said housing.

* * * * *